United States Patent [19]

Seybold et al.

[11] 4,207,233

[45] Jun. 10, 1980

[54] AZO DYES CONTAINING A THIAZOLE COMPONENT

[75] Inventors: Guenther Seybold, Ludwigshafen; Heinz Eilingsfeld, Frankenthal, both of Fed. Rep. of Germany

[73] Assignee: BASF Aktiengesellschaft, Fed. Rep. of Germany

[21] Appl. No.: 827,340

[22] Filed: Aug. 24, 1977

[30] Foreign Application Priority Data

Sep. 9, 1976 [DE] Fed. Rep. of Germany ....... 2640542

[51] Int. Cl.² .................. C09B 31/04; C09B 31/08; C09B 31/14
[52] U.S. Cl. .................................. 260/158; 260/153; 260/155; 260/156
[58] Field of Search ............... 260/158, 155, 156, 153

[56] References Cited

U.S. PATENT DOCUMENTS

| 3,544,550 | 12/1970 | Anderton et al. ............... 260/158 X |
| 3,770,719 | 11/1973 | Fisher et al. ...................... 260/158 |
| 3,816,391 | 6/1974 | Coates et al. ...................... 260/158 |
| 4,046,752 | 9/1977 | Hohmann et al. .................. 260/158 |

FOREIGN PATENT DOCUMENTS

| 2557410 | 6/1977 | Fed. Rep. of Germany ........... 260/158 |
| 1431442 | 4/1976 | United Kingdom ................... 260/158 |

*Primary Examiner*—Floyd D. Higel
*Attorney, Agent, or Firm*—Keil & Witherspoon

[57] ABSTRACT

Azo dyes of the formula

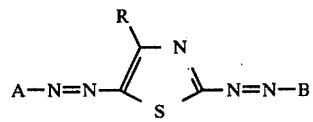

where A is a radical of a diazo component, B is a radical of a coupling component and R is hydrogen, halogen, a substituted or unsubstituted hydrocarbon radical, substituted or unsubstituted alkoxy or aroxy, or substituted amino. The dyes are eminently suitable for dyeing polyester and particularly for cellulose and blends of cellulose with polyesters.

10 Claims, No Drawings

AZO DYES CONTAINING A THIAZOLE COMPONENT

The present invention relates to azo dyes which are free from sulfonic acid groups, of the formula I

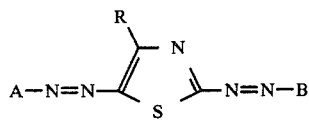

where A is a radical of a diazo component, B is a radical of a coupling component and R is hydrogen, halogen, a substituted or unsubstituted hydrocarbon radical, substituted or unsubstituted alkoxy or aroxy, or substituted amino.

Suitable diazo components are amines of the aromatic carbocyclic series, especially of the naphthalene series and above all of the benzene series, which may or may not be substituted by halogen, nitro, carboxyl, alkoxycarbonyl, trifluoromethyl, alkyl, aryl, alkoxy, SCN, alkylsulfonyl, arylsulfonyl, carbamoyl, sulfamoyl or arylazo.

Heterocyclic diazo components are also suitable, especially those of the thiazole, benzthiazole, benzisothiazole, thiadiazole, triazole, pyrazole, indazole and thiophene series, which may or may not be substituted, for example by halogen, alkyl, aryl, cyano, nitro, carbamoyl, carbalkoxy or substituted or unsubstituted mercapto.

Examples of suitable radicals B are those of the aniline, α-aminonaphthalene, aminothiazole, pyridine or indole series. Coupling components of the aniline series are preferred.

Particularly valuable radicals B are those of the formula:

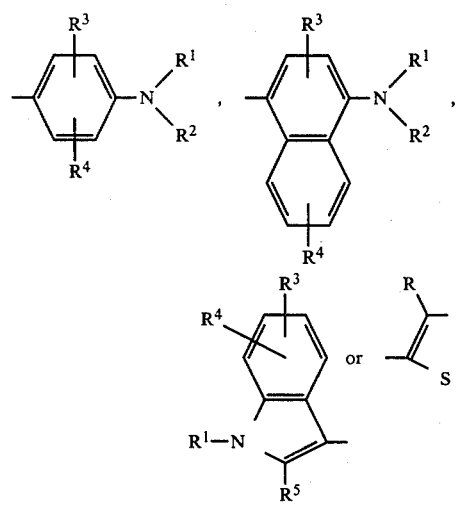

where $R^1$ and $R^2$ are allyl, substituted or unsubstituted alkyl, aralkyl or aryl, $R^3$ and $R^4$ are hydrogen, alkyl, aralkyl, halogen, alkoxy, acylamino, alkylsulfonyl, arylsulfonyl, carbamoyl, carbalkoxy or sulfamoyl and $R^5$ is hydrogen, alkyl or aryl.

The carbamoyl and sulfamoyl radicals $R^3$ and $R^4$, and the carbamoyl and sulfamoyl radicals which are substituents of A, as well as carbamoyl radicals present as substituents of the alkyl radicals $R^1$ or $R^2$ may or may not be monosubstituted or disubstituted by alkyl, aryl, cycloalkyl or a heterocyclic radical, and where they are substituted the substituents, together with the nitrogen of the carbamoyl or sulfamoyl radical may, with or without a further heteroatom, form a ring. Radicals of such heterocyclic rings formed by inclusion of the nitrogen atom are for example:

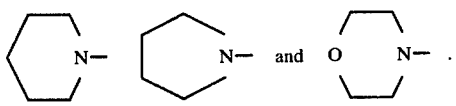

Alkyl in the alkylsulfonyl, alkylsulfonylamino, substituted carbamoyl and sulfamoyl radicals and carboxylic acid esters, and as a substituent of A, and as the radical $R^3$ or $R^4$, is, for example, alkyl of 1 to 4 carbon atoms which may or may not be substituted by halogen, cyano, hydroxyl, oxycarbonyl or alkoxy of 1 to 4 carbon atoms; specific examples are methyl, ethyl, n- or i-propyl, n- or i-butyl, β-hydroxyethyl, β-cyanoethyl, β-ethoxycarbonylethyl, βchloroethyl, β-oxycarbonylethyl, β-hydroxybutyl, β-methoxyethyl, β-propoxyethyl and β-butoxyethyl.

Alkyl R, $R^1$, $R^2$ and $R^5$ may be, for example, alkyl of 1 to 4 carbon atoms, which may or may not be substituted by halogen, cyano, hydroxyl, alkoxy of 1 to 4 carbon atoms, benzyloxy, phenoxy, alkylcarbonyloxy (where alkyl is of 1 to 4 carbon atoms) which may or may not be substituted by a further oxycarbonyl, oxycarbonyl, alkoxycarbonyl (where alkoxy is of 1 to 4 carbon atoms), alkoxy carbonyloxy (where alkoxy is of 1 to 4 carbon atoms), carbamoyl, oxalyl, phthalyl, phenylaminocarbonyloxy, alkylaminocarbonyloxy (where alkyl is of 1 to 4 carbon atoms), phenoxycarbonyloxy, phenylcarbonyloxy or the radical of a heterocyclic ring, eg.

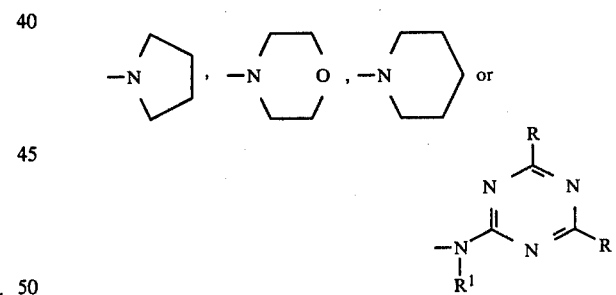

Specific examples of such radicals are methyl, ethyl, propyl, butyl, methoxymethyl, β-ethoxyethyl, β-hydroxyethyl, β-cyanoethyl, β-chloroethyl, β-phenoxyethyl, β-benzyloxyethyl, β-acetoxyethyl, β-propionyloxyethyl, β-ethoxycarbonyloxyethyl, β-phenoxycarbonyloxyethyl, β-ethoxycarbonyl-ethyl, β-butoxycarbonyl-ethyl, β-aminocarbonyl-ethyl, β-(diethylaminocarbonyl)-ethyl, β-(methylaminocarbonyloxy)-ethyl, β-(phenylaminocarbonyloxy)-ethyl, β-oxycarbonylethyl, β-oxalylethyl, β-phthalethyl and the radicals

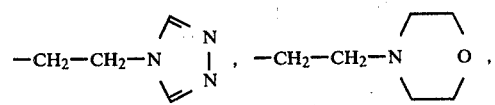

-continued

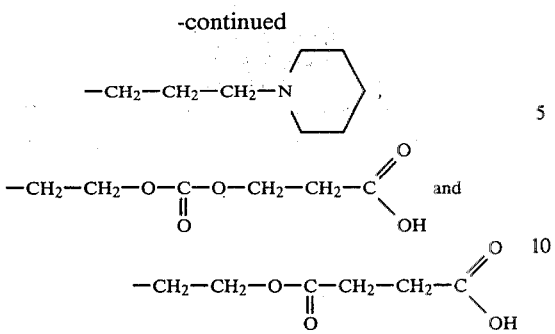

Aryl R, R¹, R² and R⁵ in the substituted carbamoyl and sulfamoyl groups, the azoaryl radicals and the arylsulfonyl groups, and as a substituent of A, is in particular phenyl or naphthyl which may or may not be substituted further by phenyl, alkyl of 1 to 4 carbon atoms, nitro, halogen, alkoxy of 1 to 4 carbon atoms, alkylmercapto of 1 to 4 carbon atoms or phenylmercapto, eg. phenyl, 1- and 2-naphthyl, p-biphenyl, 4-chlorophenyl, 2,4-dichlorophenyl, 4-ethoxyphenyl, o-, m- and p-tolyl, 4-nitrophenyl, 4-ethylphenyl, 4-methylmercapto-phenyl, 4-ethylmercapto-phenyl, 4-butylmercaptophenyl and 4-phenylmercapto-phenyl. Aryl radicals R may also be substituted by dialkylamino, eg. dimethylamino, diethylamino, dipropylamino, dibutylamino, di-β-hydroxyethylamino, N-ethyl-N-hydroxyethylamino, N-ethyl-N-cyanoethylamino and N-hydroxyethyl-N-cyanoethylamino and also by, for example, acetylamino.

Aralkyl as a substituent in the sulfamoyl, carbamoyl or aralkylsulfonyl groups or as R, R¹, R², R³ and R⁴ is, in particular, benzyl or 2-phenylethyl. The phenyl radical of these groups may or may not be substituted further by alkyl of 1 to 4 carbon atoms, alkoxy of 1 to 4 carbon atoms, halogen or cyano. Examples of such aralkyl groups are benzyl, 2-phenylethyl, p-methylbenzyl, p-methoxybenzyl, 2,4-dichlorobenzyl, 4-cyanobenzyl and p-bromophenylethyl.

Halogen is fluorine, chlorine or bromine, especially chlorine and bromine.

Alkoxy R, R³, R⁴ and R⁵, and as a substituent of A, is, in particular, alkoxy of 1 to 4 carbon atoms, which may or may not be substituted by OH, halogen or cyano, eg. methoxy, ethoxy, butoxy, β-hydroxyethoxy, β-cyanoethoxy or β-chloroethoxy.

Acyl in the acylamino groups, R, R³ and R⁴ is, in particular, alkanoyl of 1 to 4 carbon atoms, arylcarbonyl, alkylsulfonyl of 1 to 4 carbon atoms or arylsulfonyl. Aryl is, in particular, phenyl, which may or may not be substituted by alkyl of 1 to 4 carbon atoms, alkoxy of 1 to 4 carbon atoms, chlorine or cyano. Alkyl in alkylcarbonyl may or may not be substituted by Cl, Cn or an oxycarbonyl radical.

Examples of acyl are acetyl, propionyl, methylsulfonyl, ethylsulfonyl, p-methylphenylsulfonyl, phenylsulfonyl, 2,5-dimethylphenylsulfonyl, 2-methyl-5-chlorophenylsulfonyl, p-ethoxybenzoyl, p-chlorobenzoyl, o-chlorobenzoyl, p-cyanobenzoyl and the radicals

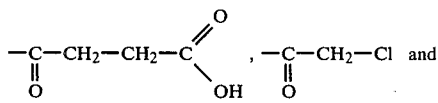

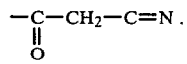

The dyes of the formula I are obtained by coupling a diazotized amine of the formula

A—NH₂ with a 2-aminothiazole of the formula II $$\underset{S}{\overset{R}{\underset{}{\diagdown}}}\hspace{-0.2em}\rangle\!-\!NH_2,\quad II$$

diazotizing the resulting dye of the formula III $$A-N=N-\underset{S}{\overset{R}{\underset{}{\diagdown}}}\hspace{-0.2em}\rangle\!-\!NH_2\quad III$$

and coupling the product with a coupling component B—H, A, B and R having the above meanings.

The diazotization of the dyes of the formula III and the coupling with B—H are preferably carried out in an anhydrous solvent, eg. a carboxylic acid, a carboxylic acid ester, a carboxylic acid amide, hydrocarbon, halohydrocarbon or ether, using an ester or salt of nitrous acid as the diazotizing agent, in the presence of a carboxylic acid.

In particular, dimethylformamide, glacial acetic acid and formic acid have proved suitable solvents and neopentylglycol dinitrite and sodium nitrite have proved suitable diazotizing agents.

Examples of suitable amines A-NH₂ are aniline, 4-toluidine, 4-chloroaniline, 2-nitroaniline, 3-nitroaniline, 4-nitroaniline, 4-cyanoaniline, 2-chloro-4-nitroaniline, 2-methyl-4-nitroaniline, 2-methoxy-4-nitroaniline, 2-bromo-4-nitroaniline, 2-nitro-4-methylaniline, 2-nitro-4-chloroaniline, 2-nitro-4-methoxyaniline, 2-nitro-4-methylsulfonylaniline, 4-acetylaminoaniline, 4-methoxycarbonylaniline, 4-ethyloxycarbonylaniline, 4-benzyloxycarbonylaniline, 4-phenylaminocarbonylaniline, 2-chloro-5-(β-hydroxyethyl)-aminosulfonylaniline, 2-chloro-4-methylsulfonylaniline, 2-methyl-5-nitroaniline, 2-methyl-5-chloroaniline, 3-chloro-4-cyanoaniline, 2-methoxy-5-chloroaniline, 3,5-dichloroaniline, 2,4-dichloroaniline, 2,5-dichloroaniline, 2-cyano-5-chloroaniline, 2-methoxy-4-nitroaniline, 2,6-dichloroaniline, 2,4,5-trichloroaniline, 2,6-dichloro-4-nitroaniline, 2,6-dichloro-4-(dimethyl-aminosulfonyl)-aniline, 2,5-dichloro-4-(diethylaminosulfonyl)-aniline, 4-(diethylaminosulfonyl)-aniline, 2-phenylsulfonylaniline, 4-propylsulfonylaniline, 2,5-dichloro-4-methylsulfonylaniline, 4-aminoazobenzene, 4-methoxy-4'-aminoazobenzene, 1-aminonaphthalene, 2-aminonaphthalene, 2-chloro-1-aminonaphthalene, 6-methyl-2-aminobenzthiazole, 6-methoxy-2-aminobenzthiazole, 2-amino-4-phenylthiazole, 2-aminothiazole, 2-amino-5-cyanothiazole, 2-aminoimidazole, 2-amino-4,5-dimethylimidazole and 3-aminoindazole.

Suitable 2-aminothiazoles of the formula II are 2-aminothiazole, 2-amino-4-methylthiazole, 2-amino-4- ethylthiazole, 2-amino-4-phenylthiazole, 2-amino-4-p-methoxyphenylthiazole, 2-amino-4-methoxythiazole, 2-amino-4-dimethylaminothiazole, 2-amino-4-(2,4-dimethoxyphenyl)-thiazole, 2-amino-4-p-methylmercaptophenyl-thiazole, 2-amino-4-p-acetylaminophenyl-thiazole, 2-amino-4-p-phenylmercaptophenyl-thiazole, 2-amino-4-p-chlorophenylthiazole and 2-amino-p-bromophenyl-thiazole.

Suitable coupling components B-H are N,N-dimethylaniline, N,N-diethylaniline, N,N-bis-(β-hydroxyethyl)-aniline, N,N-bis-(β-chloroethyl)-aniline, N,N-bis-(β-cyanoethyl)-aniline, N,N-bis-(β-acetoxy-ethyl)-aniline, N,N-bis-(β-ethoxycarbonylethyl)-aniline, N-ethyl-N-(β-cyanoethyl)-aniline, N-methyl-N-benzylaniline, N-benzyl-N-(β-cyanoethyl)-aniline, N-ethyl-N-(β-acetoxyethyl)-aniline, N-(β-acetoxyethyl)-N-(β-cyanoethyl)-aniline, N-ethyl-N-(β-chloroethyl)-aniline, N-(β-cyanoethyl)-N-(β-benzoyloxyethyl)-aniline, N,N-diethyl-3-methyl-aniline, N-ethyl-N-(β-cyanoethyl)-3-methyl-aniline, N,N-bis-(β-acetoxyethyl)-3-methylaniline, N,N-bis-(β-methoxycarbonyloxyethyl)-3-ethyl-aniline, N-(β-ethoxyethyl)-N-(β-cyanoethyl)-3-methyl-aniline, N,N-bis-(β-cyanoethyl)-3-methyl-aniline, N,N-diethyl-3-chloro-aniline, N,N-bis-(β-cyanoethyl)-3-chloro-aniline, N,N-diethyl-3-methoxyaniline, N,N-diethyl-3-acetylamino-aniline, N,N-bis-(β-acetoxyethyl)-3-acetylamino-aniline, N,N-diethyl-3-(β-cyanoacetylamino)-aniline, N,N-diethyl-3-(methylsulfonylamino)-aniline, N,N-diethyl-3-(phenylsulfonylamino)-aniline, N,N-diethyl-2-methoxy-5-acetylamino-aniline, N,N-diethyl-2,5-dimethoxy-aniline, N-ethyl-N-(β-cyanoethyl)-3-(methylsulfonylamino)-aniline, N-ethyl-N-(β-diethylaminocarbonylethyl)-aniline, N,N-bis-(β-methylaminocarbonyloxy-ethyl)-aniline, N-ethyl-N-(β-phenylaminocarbonyloxyethyl)-aniline, 2-methyl-indole, 1,2-dimethylindole, 2-phenylindole, 1-β-cyanoethyl-2-phenyl-indole, 1-(2-hydroxy-2-phenylethyl)-2-phenyl-indole, 1-(2-hydroxy-2-methyl-propyl)-2-phenylindole, 2-ethylindole, N,N-diethyl-1-aminonaphthalene, N,N-diethyl-2-aminonaphthalene, N-ethyl-N-benzyl-1-aminonaphthalene, N-benzyl-1-aminonaphthalene, N-ethyl-N-(β-cyanoethyl)-1-aminonaphthalene, N,N-bis-(β-ethoxycarbonyloxyethyl)-1-aminonaphthalene, 1-phenyl-3-methyl-5-pyrazolone, 1-(2-chloro-phenyl)-3-methyl-5-pyrazolone, 1-(2,5-dichlorophenyl)-3-ethyl-5-pyrazolone and 1-(4-methylphenyl)-3-carbethoxy-5-pyrazolone.

The dyes of the invention may be used for dyeing synthetic fibrous materials such as nylons and polyesters, eg. polyethylene terephthalate and poly-1,4-cyclohexanedimethylene terephthalate, from aqueous liquors or organic solvents. The high color yield of the new dyes is striking. The stated types of fibers are dyed in hues ranging from violet to bluish green. The dyeings are distinguished by excellent fastness to thermofixing, good washfastness and good to very good lightfastness.

Though, from the point of view of their structure, the dyes of the formula I must be described as disperse dyes which as a rule cannot be applied to, for example, cotton, it does prove possible, using the process described in U.S. Pat. No. 3,706,525, to dye cellulose and cellulosic textile materials with these dyes. The data in the said patent relating to process conditions apply, in their general sense, also to the dyes of the invention. Furthermore, German Patent Application No. P 25 24 243.7 and U.S. Pat. No. 4,049,377 describe further processes by means of which the dyes of the invention can be applied. Amongst these printing processes are preferred.

The dyes of the invention are advantageously converted to formulations which in addition to the dyes of the formula I contain dispersing agents, humectants and water, with or withouth other components conventionally used in dye formulations, eg. disinfectants or antifoaming agents. Suitable dispersing agents are non-ionic or, in particular, anionic compounds, ie. the dispersing agents conventionally used. Specific examples are ligninsulfonates or polyadducts of ethylenediamine with ethylene oxide and propylene oxide, and the sodium salts of the sulfonic acid half-esters of these polyadducts. Suitable humectants are glycols and glycol ethers, preferably ethylene glycol, in addition to polyalcohols, eg. glycerol.

The formulations give dyeings and prints with excellent fastness properties, amongst which the wetfastness and, in some case, also the lightfastness are to be mentioned. In printing, no staining of any white ground occurs, for example on washing. In particular, black shades can be achieved with the dyes of the formula I.

Dyes of particular industrial importance are those of formula Ia

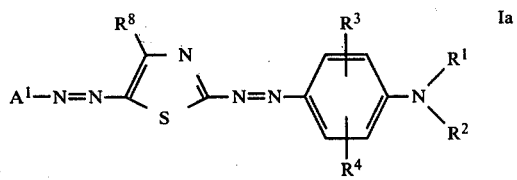

where $A^1$ is phenyl which may or may not be substituted, $R^1$ and $R^2$ are alkenyl or alkyl which may or may not be substituted, $R^3$ is hydrogen, alkyl of 1 to 4 carbon atoms or alkoxy of 1 to 4 carbon atoms, $R^4$ is hydrogen, chlorine, bromine, methyl, ethyl, alkanoylamino of 1 to 4 carbon atoms or sulfamoyl which may or may not be substituted and $R^8$ is hydrogen, alkyl which may or may not be substituted, or aryl.

Phenyl $A^1$ may be substituted by, for example, chlorine, bromine, fluorine, trifluoromethyl, methyl, ethyl, methoxy, ethoxy, arylazo, alkoxycarbonyl (where alkoxy is of 1 to 4 carbon atoms), alkoxyethoxycarbonyl (where alkoxy is of 1 to 4 carbon atoms), cyano, methylsulfonyl, ethylsulfonyl, alkanoylamino of 1 to 4 carbon atoms, or carbamoyl or sulfamoyl which may or may not be substituted. Specific examples of substituents, in addition to those already mentioned are: $H_5C_6-N=N-$, $ClH_4C_6-N=N-$, $H_3CH_4C_6-N=N-$, $H_3COH_4C_6-N=N-$, $COOCH_3$, $COOC_2H_5$, $COOC_3H_7$, $COOC_4H_9$, $COOC_2H_4OCH_3$, $COOC_2H_4OC_2H_5$, $COOC_2H_4OC_4H_9$, $CO(OC_2H_4)_2OCH_3$, $CO(OC_2H_4)_2OC_4H_9$, $CH_3CONH$, $H_5C_2CONH$, $H_7C_3CONH$, $CONH(CH_2)_3OCH_3$, $CONHC_4H_9$,

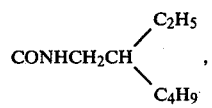

$CONHC_6H_{13}$, $CONHC_8H_{17}$, $CONH(CH_3)_2OC_2H_4OC_6H_5$, $CONH(CH_2)_3OC_2H_4OCH_2C_6H_5$, $CONH(CH_2)_3O(CH_2)_4OH$, $CONH(CH_2)_3OC_6H_{11}$ and the corresponding sulfamoyl radicals.

Examples of radicals R¹ and R² are allyl, and alkyl of 1 to 4 carbon atoms which may in addition be substituted by chlorine, hydroxyl, cyano, alkanoyloxy of 1 to 4 carbon atoms, alkoxycarbonyl of 1 to 4 carbon atoms or phenyl.

Specific examples of such radicals are CH₃, C₂H₅, C₃H₇, C₄H₉, C₂H₄Cl, C₂H₄CN, C₂H₄OH, C₂H₄OCOCH₃, C₂H₄OCOC₂H₅, C₂H₄OCOC₃H₇, C₂H₄COOCH₃, C₂H₄COOC₂H₅, C₂H₄COOC₃H₇, C₂H₄COOC₄H₉, C₂H₄CH(COOCH₃)₂, CH₂CHOHCH₃, CH₂CHOHCH₂OH, CH₂CHOHCH₂Cl,

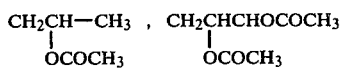

CH₂C₆H₅, C₂H₄C₆H₅, CH₂CH₂COCH₃ and (CH₂)₃NHCOCH₃.

Examples of R³ are hydrogen, C₂H₅, C₃H₇, C₄H₉, OC₃H₇, OC₄H₉ and preferably CH₃, OCH₃ and C₂H₅.

Examples of radicals R⁴, in addition to those already mentioned, are NHCHO, NHCOC₃H₇, SO₂NHCH₃, SO₂NHC₂H₅, SO₂NHC₃H₇, SO₂NHC₄H₉ and SO₂NH(CH₂)₃OCH₃ and preferably NHCOCH₃.

Examples of substituents R⁸ are hydrogen, alkyl of 1 to 4 carbon atoms which may or may not be substituted by hydroxyl, chlorine, cyano or methylmercapto and phenyl which may or may not be substituted by chlorine, bromine, methyl, ethyl, alkylmercapto of 1 to 4 carbon atoms, phenylmercapto, methoxy, ethoxy or cyano; accordingly, specific examples are CH₃, C₂H₅, C₃H₇, C₄H₉, CH₂OH, CH₂Cl, CH₂CN, CH₂—SCH₃, C₆H₄Cl, C₆H₃Cl₂, C₆H₄CH₃, C₆H₃(CH₃)₂, C₆H₄OCH₃, C₆H₃(OCH₃)₂, C₆H₃(CH₃)OCH₃, C₆H₄OC₂H₅, C₆H₄CN, C₆H₄SCH₃, C₆H₄SC₂H₅ and C₆H₄SC₆H₅.

In particular, the invention relates to dyes of the formula

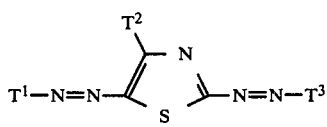

where T¹ is phenyl which is unsubstituted or is substituted by fluorine, chlorine, bromine, methyl, trifluoromethyl, ethyl, alkoxy of 1 to 4 carbon atoms, phenylazo, cyano, nitro, methylsulfonyl, ethylsulfonyl, dialkylcarbamoyl (where alkyl is of 1 to 4 carbon atoms), dialkylsulfamoyl (where alkyl is of 1 to 4 carbon atoms), alkoxycarbonyl (where alkoxy is of 1 to 8 carbon atoms), alkylmercapto (where alkyl is of 1 to 4 carbon atoms) or phenylmercapto, or is thiazolyl which is unsubstituted or substituted by alkyl of 1 to 4 carbon atoms, phenyl or cyano, or is benzthiazolyl which is unsubstituted or substituted by chlorine, bromine, methyl, ethyl, alkoxy of 1 to 4 carbon atoms or methylsulfonyl or is thienyl which is unsubstituted or substituted by alkyl of 1 to 4 carbon atoms, cyano, nitro, phenyl or alkoxycarbonyl (where alkoxy is of 1 to 8 carbon atoms), T² is hydrogen or is alkyl of 1 to 4 carbon atoms which may or may not be substituted by chlorine, bromine, hydroxyl, alkoxy of 1 to 4 carbon atoms, alkylmercapto of 1 to 4 carbon atoms, phenoxy, phenylmercapto, cyano, alkylsulfonyl of 1 to 4 carbon atoms, phenylsulfonyl, alkoxycarbonyl (where alkoxy is of 1 to 4 carbon atoms, or monoalkyl- or dialkyl-carbamoyl or -sulfamoyl (where alkyl is of 1 to 4 carbon atoms, or is cyclohexyl, benzyl or phenylethyl, or is phenyl which is unsubstituted or substituted by chlorine, bromine, alkyl of 1 to 4 carbon atoms, phenyl, hydroxyl, alkoxy of 1 to 4 carbon atoms, dialkylamino of 1 to 4 carbon atoms, alkanoylamino of 1 to 4 carbon atoms, alkylmercapto of 1 to 4 carbon atoms or phenylmercapto, and T³ is a radical of the formula

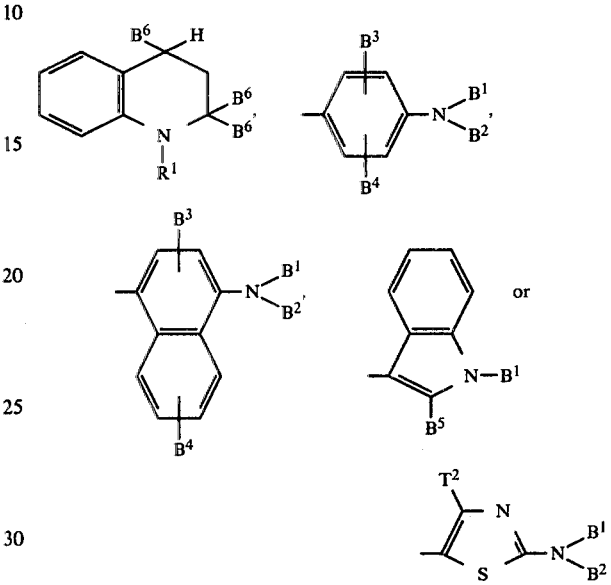

where B¹ is allyl, alkyl of 1 to 4 carbon atoms, alkyl of 2 to 4 carbon atoms which is substituted by hydroxyl, chlorine, bromine, cyano, alkoxycarbonyl (where alkoxy is of 1 to 4 carbon atoms), alkoxy of 1 to 4 carbon atoms, acetyl, alkanoyloxy of 1 to 4 carbon atoms, alkylaminocarbonyloxy (where alkyl is of 1 to 4 carbon atoms or phenylaminocarbonyloxy, cyclohexyl, benzyl, phenylethyl, phenyl and methoxyphenyl, B² is allyl, alkyl of 1 to 4 carbon atoms or alkyl of 2 to 4 carbon atoms which is substituted by hydroxyl, chlorine, bromine, cyano, alkoxycarbonyl (where alkoxy is of 1 to 4 carbon atoms), alkoxy of 1 to 4 carbon atoms, acetyl, alkanoyloxy of 1 to 4 carbon atoms, alkylaminocarbonyloxy (where alkyl is of 1 to 4 carbon atoms) or phenylaminocarbonyloxy, B¹ and B² together with the nitrogen are pyrrolidino, piperidino or morpholino, B³ is hydrogen, alkyl of 1 to 4 carbon atoms or alkoxy of 1 to 4 carbon atoms, B⁴ is hydrogen, chlorine, bromine, alkyl of 1 to 4 carbon atoms, alkanoylamino of 1 to 4 carbon atoms or monoalkyl- or dialkylsulfamoyl (where alkyl is of 1 to 4 carbon atoms), B⁵ is methyl or phenyl and B⁶ is hydrogen or methyl.

Preferably, T¹ is phenyl which is unsubstituted or substituted as indicated, especially by chlorine, bromine, methyl, methoxy, ethoxy or phenylazo.

T² is preferably hydrogen, methyl, alkoxycarbonylmethyl (where alkoxy is of 1 to 4 carbon atoms) or, especially, phenyl which is unsubstituted or substituted by chlorine, methyl, methoxy, ethoxy, methylmercapto, ethylmercapto or phenylmercapto.

T³ is, in particular, a radical of the formula

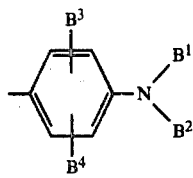

where $B^1$ and $B^2$ independently of one another are ethyl, alkyl of 1 to 4 carbon atoms or alkyl of 2 or 3 carbon atoms which is substituted by hydroxyl, cyano, alkoxy of 1 to 4 carbon atoms, alkoxycarbonyl (where alkoxy is of 1 to 4 carbon atoms) or alkanoyloxy of 1 to 4 carbon atoms, $B^3$ is hydrogen, methyl, methoxy or ethoxy and $B^4$ is hydrogen, methyl, chlorine or alkanoylamino of 1 to 4 carbon atoms.

Particularly preferred dyes have the formula

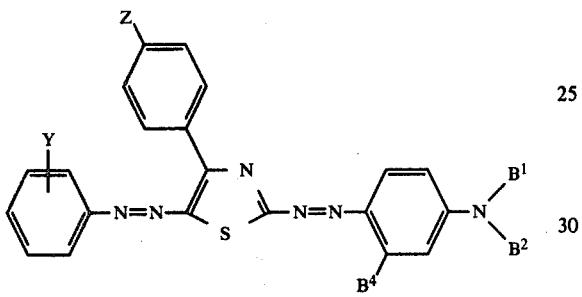

where Y is hydrogen, methyl, methoxy or chlorine, Z is hydrogen, alkoxy of 1 to 4 carbon atoms, alkylmercapto of 1 to 4 carbon atoms, phenylmercapto, chlorine or methyl, $B^4$ is hydrogen, chlorine, methyl or alkanoylamino of 1 to 4 carbon atoms and $B^1$ and $B^2$ have the meanings given above.

In the Examples which follow, parts and percentages are by weight, unless stated otherwise.

EXAMPLE 1

47 Parts of aniline are dissolved in 150 parts by volume of water and 150 parts of concentrated hydrochloric acid and a solution of 35 parts of sodium nitrite in 50 parts of water is added at 0°–5° C. After 1 hour, the entire batch is poured into a mixture of 500 parts of ice, 75 parts of 2-amino-4-methylthiazole and 500 parts of water. Sodium acetate is added and when the coupling reaction has ended the orange red dye of the formula (a) is filtered off and dried at 50° C.

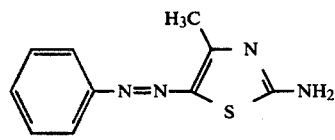

6.8 Parts of the dye and 5.2 parts of N,N-β-cyanoethyl-ethylaniline are suspended in 150 parts by volume of glacial acetic acid and 3.1 parts of neopentylglycol dinitrite are added at 20° C. After stirring for four hours at room temperature, the mixture is poured onto ice and the bluish violet dye of the formula (b) is filtered off. Yield: 11.2 parts.

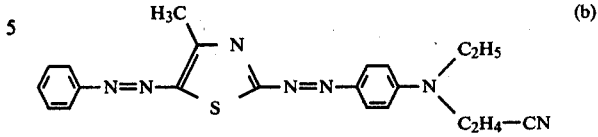

EXAMPLE 2

6.3 Parts of the dye of the formula (a) and 5.2 parts of N,N-β-cyanoethyl-ethylaniline are dissolved in 100 parts of formic acid and 2 parts of sodium nitrite are added in portions at 10° C. After 4 hours, the mixture is poured onto ice and the dye of the formula (b), which has separated out, is filtered off. Yield: 5.1 parts.

EXAMPLE 3

81 Parts of 2,4-dichloroaniline are dissolved in 400 parts of hot half-concentrated hydrochloric acid, the mixture is then cooled to 0° C. and the 2,4-dichloroaniline is diazotized with 35 parts of sodium nitrite dissolved in a little water.

The diazonium salt solution is coupled with 2-amino-4-methylthiazole by the method described in Example 1. The orange azo dye of the formula (c)

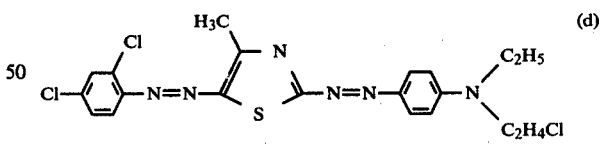

is obtained.

8.6 Parts of this dye, 5.2 parts of β-chloroethylaniline and 1 part of trichloroacetic acid are dissolved in 100 parts by volume of dimethylformamide and 2.8 parts of neopentylglycol dinitrite are added at room temperature. After stirring for three hours at room temperature, the mixture is poured onto 400 parts of ice and the bluish green dye of the formula (d) is filtered off. Yield: 10.2 parts

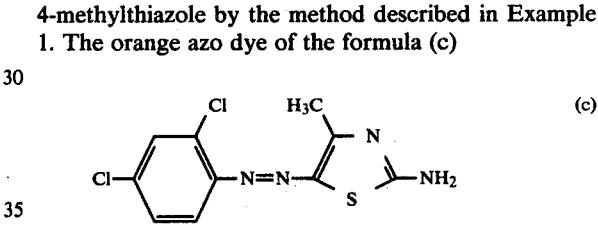

EXAMPLE 4

5.9 Parts of the dye of the formula (c) are dissolved in 90 parts of 85% strength phosphoric acid, 50 parts of glacial acetic acid and 30 parts of propionic acid and 9 parts of nitrosylsulfuric acid (12.8% $N_2O_3$) are added dropwise at 0°–5° C. After 3 hours, the mixture is poured into 3.4 parts of β-cyanoethyl-ethylaniline and 300 parts of ice. The mixture is neutralized with 60 parts of sodium formate and after the coupling has ended the blue dyed is filtered off. Yield: 1.8 parts of the dye of the formula (d).

The dyes listed in the Table were prepared by a procedure similar to that described in Examples 1–4.

TABLE

| Example | Diazo component | 1st coupling component | 2nd coupling component | Hue in DMF |
|---|---|---|---|---|
| 5 | C₆H₅-NH₂ (aniline) | 2-amino-thiazole | C₆H₅-N(C₂H₄CN)(C₂H₅) | violet |
| 6 | 4-Br-C₆H₄-NH₂ | " | " | bluish violet |
| 7 | 4-Cl-C₆H₄-NH₂ | " | " | bluish violet |
| 8 | 2,4-Cl₂-C₆H₃-NH₂ | " | " | blue |
| 9 | 4-O₂N-C₆H₄-NH₂ | " | " | bluish green |
| 10 | 4-C₂H₅OOC-C₆H₄-NH₂ | " | " | blue |
| 11 | " | " | C₆H₅-N(C₂H₄COOCH₃)(C₂H₅) | " |
| 12 | 2-CN-C₆H₄-NH₂ | 2-amino-thiazole | C₆H₅-N(C₂H₄CN)(C₂H₅) | blue |
| 13 | 2-Cl-4-CH₃-C₆H₃-NH₂ | " | C₆H₅-N(C₂H₄COOCH₃)(C₂H₅) | " |
| 14 | 2,4-Cl₂-C₆H₃-NH₂ | 2-amino-thiazole | C₆H₅-N(C₂H₅)(C₂H₄OH) | blue |
| 15 | C₆H₅-NH₂ | 4-methyl-2-amino-thiazole | C₆H₅-N(C₂H₄COOCH₃)(C₂H₅) | violet |
| 16 | 4-Cl-C₆H₄-NH₂ | " | C₆H₅-N(C₂H₄CN)(C₂H₅) | bluish violet |
| 17 | 3-CH₃-C₆H₄-NH₂ | 4-methyl-2-amino-thiazole | C₆H₅-N(C₂H₄COOCH₃)(C₂H₅) | bluish violet |
| 18 | 2,4-Cl₂-C₆H₃-NH₂ | 4-methyl-2-amino-thiazole | C₆H₅-N(C₂H₄CN)(C₂H₅) | blue |
| 19 | 2-Cl-5-CF₃-C₆H₃-NH₂ | " | C₆H₅-N(C₂H₄COOCH₃)(C₂H₅) | " |
| 20 | 4-EtOOC-C₆H₄-NH₂ | " | C₆H₅-N(C₂H₄CN)(C₂H₅) | " |
| 21 | C₆H₅-NH₂ | " | 3-N(C₂H₅)₂-4-NHCOCH₃-C₆H₃ | bluish green |

TABLE-continued

| Example | Diazo component | 1st coupling component | 2nd coupling component | Hue in DMF |
|---|---|---|---|---|
| 22 | C$_6$H$_5$NH$_2$ (aniline) | 4-methyl-2-amino thiazole (H$_3$C on thiazole, NH$_2$) | 3-(NHCOCH$_3$)-4-(OCH$_3$)-C$_6$H$_3$-N(C$_2$H$_4$CN)(C$_2$H$_4$OH) | bluish green |
| 23 | 4-(C$_2$H$_5$OOC)-C$_6$H$_4$-NH$_2$ | 4-phenyl-2-amino thiazole (C$_6$H$_5$ on thiazole) | C$_6$H$_5$-N(C$_2$H$_4$CN)(C$_2$H$_5$) | bluish green |
| 24 | 2-CN-C$_6$H$_4$-NH$_2$ | 4-phenyl-2-amino thiazole | " | bluish green |
| 25 | 2-Cl-5-CF$_3$-C$_6$H$_3$-NH$_2$ | " | C$_6$H$_5$-N(C$_2$H$_4$COOCH$_3$)(C$_2$H$_5$) | blue |
| 26 | C$_6$H$_5$NH$_2$ | " | C$_6$H$_5$-N(C$_2$H$_4$CN)(C$_2$H$_5$) | bluish violet |
| 27 | " | " | C$_6$H$_5$-N(C$_2$H$_4$COOCH$_3$)(C$_2$H$_5$) | bluish black |
| 28 | C$_6$H$_5$NH$_2$ | 4-(4-methoxyphenyl)-2-amino thiazole | C$_6$H$_5$-N(C$_2$H$_4$CN)(C$_2$H$_5$) | bluish black |
| 29 | 3-CH$_3$-C$_6$H$_4$-NH$_2$ | " | " | bluish black |
| 30 | 2,4-Cl$_2$-C$_6$H$_3$-NH$_2$ | " | " | bluish black |
| 31 | C$_6$H$_5$NH$_2$ | 4-methyl-2-amino thiazole | C$_6$H$_5$-N(C$_2$H$_5$)-(CH$_2$)$_3$NH-C(C$_6$H$_5$)=N-C(triazine)=N-NH-CH(CH$_3$)$_2$ | blue |
| 32 | C$_6$H$_5$-N=N-C$_6$H$_4$-NH$_2$ | 4-methyl-2-amino thiazole | C$_6$H$_5$-N(C$_2$H$_5$)(C$_2$H$_4$COOCH$_3$) | greenish blue |
| 33 | C$_6$H$_5$NH$_2$ | T-substituted 2-amino thiazole; T = C$_6$H$_4$SCH$_3$ | C$_6$H$_5$-N(C$_2$H$_5$)(C$_2$H$_4$CN) | bluish black |
| 34 | " | C$_2$H$_4$SC$_2$H$_5$ | " | bluish black |
| 35 | " | C$_8$H$_4$SC$_3$H$_7$ | " | bluish black |
| 36 | " | C$_6$H$_4$SC$_4$H$_9$ | " | bluish black |
| 37 | " | C$_4$H$_4$SC$_6$H$_5$ | " | bluish black |
| 38 | " | C$_6$H$_3$(OCH$_3$)$_2$ | " | bluish black |
| 39 | " | C$_6$H$_3$(OC$_2$H$_5$)$_2$ | " | bluish black |
| 40 | " | C$_6$H$_4$OC$_2$H$_5$ | " | bluish |

| Example | Diazo component | 1st coupling component | 2nd coupling component | Hue in DMF |
|---|---|---|---|---|
| 41 | " | C₆H₄NHCOCH₃ | " | black bluish |
| 42 | " | C₆H₄N(CH₃)₂ | " | black bluish black |
| 43 | " | C₆H₄N(C₂H₅)₂ | " | bluish black |

If instead of aniline, anilines substituted by methyl, methoxy, ethoxy, chlorine or bromine are used as the diazo component, dyes having very similar properties are obtained. Similarly, the 2nd coupling component can be varied in the conventional manner for the p-aminoazobenzene dye series.

We claim:

1. A dye of the formula

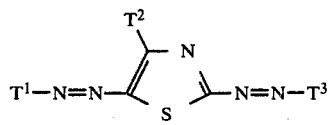

where $T^1$ is phenyl; phenyl substituted by fluorine, chlorine, bromine, methyl, trifluoromethyl, ethyl, alkoxy of 1 to 4 carbon atoms, phenylazo, cyano, nitro, methylsulfonyl, ethylsulfonyl, dialkylcarbamoyl where alkyl is of 1 to 4 carbon atoms, dialkylsulfamoyl where alkyl is of 1 to 4 carbon atoms, alkoxycarbonyl where alkoxy is of 1 to 8 carbon atoms, alkylmercapto where alkyl is of 1 to 4 carbon atoms or phenylmercapto; thiazolyl; thiazolyl substituted by alkyl of 1 to 4 carbon atoms, phenyl or cyano; benzthiazolyl; benzthiazolyl substituted by chlorine, bromine, methyl, ethyl, alkoxy of 1 to 4 carbon atoms or methylsulfonyl; thienyl; or thienyl substituted by alkyl of 1 to 4 carbon atoms, cyano, nitro, phenyl or alkoxycarbonyl where alkoxy is of 1 to 8 carbon atoms; $T^2$ is hydrogen; alkyl of 1 to 4 carbon atoms; alkyl of 2 to 4 carbon atoms substituted by chlorine, bromine, hydroxyl, alkoxy of 1 to 4 carbon atoms, alkylmercapto of 1 to 4 carbon atoms, phenoxy, phenylmercapto, cyano, alkylsulfonyl of 1 to 4 carbon atoms, phenylsulfonyl, alkoxycarbonyl where alkoxy is of 1 to 4 carbon atoms, monoalkyl- carbamoyl where alkyl is of 1 to 4 carbon atoms, dialkyl-carbamoyl where alkyl is of 1 to 4 carbon atoms, monoalkyl-sulfamoyl where alkyl is of 1 to 4 carbon atoms or dialkylsulfamoyl where alkyl is of 1 to 4 carbon atoms; cyclohexyl; benzyl; phenylethyl; phenyl; or phenyl substituted by chlorine, bromine, alkyl of 1 to 4 carbon atoms, phenyl, hydroxyl, alkoxy of 1 to 4 carbon atoms, dialkylamino where alkyl is of 1 to 4 carbon atoms, alkanoylamino of 1 to 4 carbon atoms, alkylmercapto of 1 to 4 carbon atoms or phenylmercapto, and $T^3$ is a radical of the formula

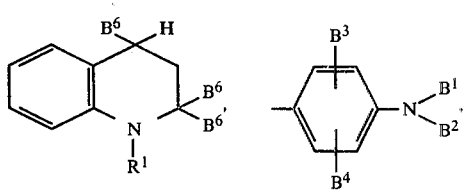

-continued

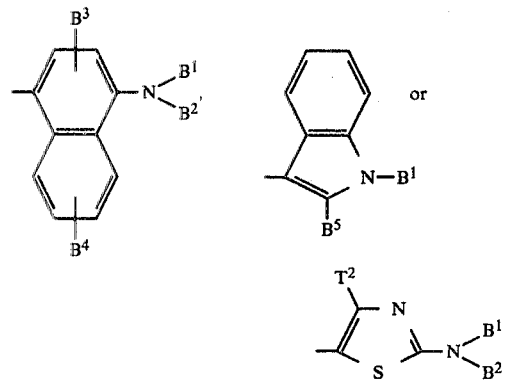

where $B^1$ is allyl, alkyl of 1 to 4 carbon atoms; alkyl of 2 to 4 carbon atoms which is substituted by hydroxyl, chlorine, bromine, cyano, alkoxycarbonyl where alkoxy is of 1 to 4 carbon atoms, alkoxy of 1 to 4 carbon atoms, acetyl, alkanoyloxy of 1 to 4 carbon atoms, alkylaminocarbonyloxy where alkyl is of 1 to 4 carbon atoms or phenylaminocarbonyloxy; cyclohexyl; benzyl; phenylethyl; phenyl; and methoxyphenyl; $B^2$ is allyl; alkyl of 1 to 4 carbon atoms; or alkyl of 2 to 4 carbon atoms which is substituted by hydroxyl, chlorine, bromine, cyano, alkoxycarbonyl where alkoxy is of 1 to 4 carbon atoms, alkoxy of 1 to 4 carbon atoms, acetyl, alkanoyloxy of 1 to 4 carbon atoms, alkylaminocarbonyloxy where alkyl is of 1 to 4 carbon atoms or phenylaminocarbonyloxy; $B^1$ and $B^2$ together with the nitrogen and pyrrolidino, piperidino or morpholino, $B^3$ is hydrogen, alkyl of 1 to 4 carbon atoms or alkoxy of 1 to 4 carbon atoms; $B^4$ is hydrogen, chlorine, bromine, alkyl of 1 to 4 carbon atoms, alkanoylamino of 1 to 4 carbon atoms, monoalkylsulfamoyl where alkyl is of 1 to 4 carbon atoms, or dialkylsulfamoyl where alkyl is of 1 to 4 carbon atoms; $B^5$ is methyl of phenyl and $B^6$ is hydrogen or methyl.

2. A dye as set forth in claim 1, where $T^1$ is phenyl or phenyl substituted as specified in claim 1.

3. A dye as set forth in claim 1, where $T^1$ is phenyl or phenyl substituted by chlorine, bromine, methyl, methoxy, ethoxy or phenylazo.

4. A dye as set forth in claim 1, where $T^2$ is hydrogen, methyl, alkoxycarbonylmethyl where alkoxy is of 1 to 4 carbon atoms, phenyl or phenyl substituted by chlorine, methyl, methoxy, ethoxy, methylmercapto, ethylmercapto or phenylmercapto.

5. A dye as set forth in claim 1, where $T^3$ is a radical of the formula:

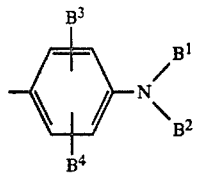

6. A dye as set forth in claim 5, where $B^3$ is hydrogen, methyl, methoxy or ethoxy and $B^4$ is hydrogen, methyl, chlorine or alkanoylamino of 1 to 4 carbon atoms.

7. A dye as set forth in claim 6, where $B^1$ and $B^2$ independently of one another are allyl, alkyl of 1 to 4 carbon atoms, or alkyl of 2 or 3 carbon atoms which is substituted by hydroxyl, cyano, alkoxy of 1 to 4 carbon atoms, alkoxycarbonyl where alkoxy is of 1 to 4 carbon atoms or alkanoyloxy of 1 to 4 carbon atoms.

8. A dye as set forth in claim 1, where $T^1$ is phenyl or phenyl substituted by chlorine, bromine, methyl, methoxy, ethoxy or phenylazo, $T^2$ is hydrogen, methyl, alkoxycarbonylmethyl where alkoxy is of 1 to 4 carbon atoms, phenyl or phenyl substituted by chlorine, methyl, methoxy, ethoxy, methylmercapto, ethylmercapto or phenylmercapto and $T^3$ is a radical of the formula

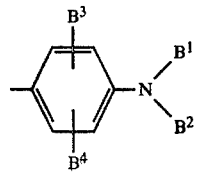

9. A dye as set forth in claim 1, of the formula

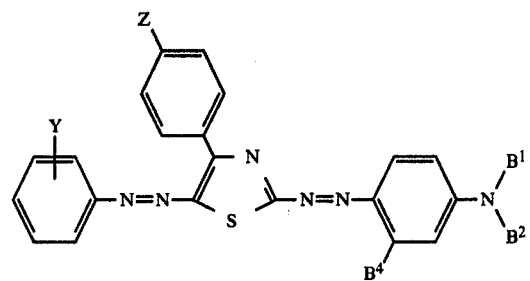

where Y is hydrogen, methyl, methoxy of chlorine, Z is hydrogen, alkoxy of 1 to 4 carbon atoms, alkylmercapto of 1 to 4 carbon atoms, phenylmercapto, chlorine or methyl, $B^4$ is hydrogen, chlorine, methyl or alkanoylamino of 1 to 4 carbon atoms and $B^1$ and $B^2$ independently of one another are allyl, alkyl of 1 to 4 carbon atoms, or alkyl of 2 or 3 carbon atoms which is substituted by hydroxyl, cyano, alkoxy of 1 to 4 carbon atoms, alkoxycarbonyl where alkoxy is of 1 to 4 carbon atoms or alkanoyloxy of 1 to 4 carbon atoms.

10. A dye as claimed in claim 1, of the formula

* * * * *